(12) United States Patent
Dwenger

(10) Patent No.: US 8,991,583 B2
(45) Date of Patent: Mar. 31, 2015

(54) SPRING PACK FOR A TRANSMISSION

(71) Applicant: GM Global Technology Operations LLC, Detroit, MI (US)

(72) Inventor: Douglas John Dwenger, Plymouth, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 81 days.

(21) Appl. No.: 13/847,187

(22) Filed: Mar. 19, 2013

(65) Prior Publication Data

US 2013/0277168 A1    Oct. 24, 2013

Related U.S. Application Data

(60) Provisional application No. 61/635,448, filed on Apr. 19, 2012.

(51) Int. Cl.

| | |
|---|---|
| *F16D 25/0638* | (2006.01) |
| *F16D 43/28* | (2006.01) |
| *F16D 13/71* | (2006.01) |
| *F16D 21/06* | (2006.01) |
| *F16D 25/06* | (2006.01) |
| *F16D 25/12* | (2006.01) |

(52) U.S. Cl.
CPC ............. *F16D 13/71* (2013.01); *F16D 21/06* (2013.01); *F16D 25/06* (2013.01); *F16D 25/12* (2013.01)
USPC ..................................... 192/85.41; 192/70.28

(58) Field of Classification Search
CPC ...... F16D 25/10; F16D 25/0638; F16D 25/12
USPC ................................. 192/85.39, 85.41, 70.28
See application file for complete search history.

(56) References Cited

U.S. PATENT DOCUMENTS

| 2,868,341 A * | 1/1959 | Snoy ........................ 192/48.613 |
|---|---|---|
| 8,123,014 B2 * | 2/2012 | Wooden .................. 192/48.613 |

FOREIGN PATENT DOCUMENTS

| JP | 2006132551 A | 5/2006 |
|---|---|---|
| JP | 2007232217 A | 9/2007 |
| KR | 20070024704 A | 3/2007 |

* cited by examiner

*Primary Examiner* — Robert A Siconolfi
*Assistant Examiner* — Huan Le

(57) ABSTRACT

A spring pack for a transmission includes first rotatable piston and a second rotatable piston. The first rotatable piston includes a first retainer plate, and the second rotatable piston includes a second retainer plate. The spring pack further includes a tabbed retainer plate that is stationary with respect to the first piston and the second piston and also includes a set of biasing members with a first subset of biasing members and a second subset of biasing members. The first subset of biasing members is disposed between the first retainer plate and the tabbed retainer plate, and the second subset of biasing members is disposed between the second retainer plate and the tabbed retainer plate. As the first and second pistons are activated, they stroke independently of each other as each retainer plate compresses its respective subset of biasing members against the tabbed retainer plate.

14 Claims, 2 Drawing Sheets

SPRING PACK FOR A TRANSMISSION

CROSS-REFERENCE TO RELATED APPLICATION

Figure 1:
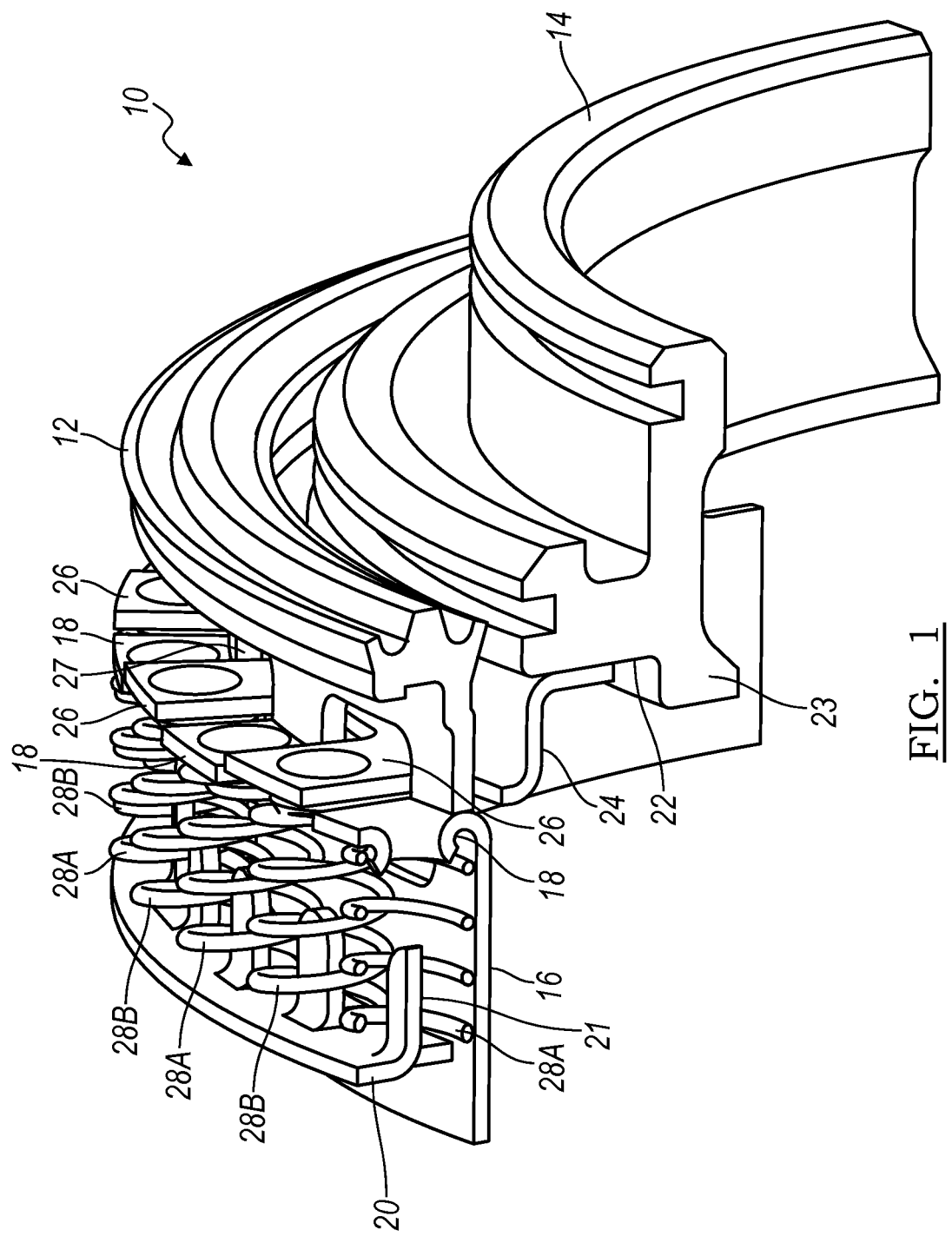

This application claims the benefit of U.S. Provisional Application No. 61/635,448, filed Apr. 19, 2012, the entire contents of which are incorporated herein by reference.

FIELD

The present disclosure relates to a motor vehicle transmission. More specifically, the present disclosure relates to a spring pack for a motor vehicle transmission.

BACKGROUND

The statements in this section merely provide background information related to the present disclosure and may or may not constitute prior art.

Modern multiple speed motor vehicle transmissions commonly employ a plurality of planetary gear sets having sun gears, planet gear carriers and ring gears which are permanently coupled together or selectively interconnected by clutches or grounded by brakes to achieve reverse gear and a plurality of forward gear ratios.

While the foregoing described components provide the fundamental and necessary reverse and forward speeds or gear ratios, transmissions must also include control devices and components which select the desired or required gear ratio. In particular, transmissions may include spring packs that help facilitate the shifts to various gear ratios. For example, a transmission may include two spring packs, each with a set of springs associated with a respective return piston. Moreover, each spring pack occupies a different space within the transmission.

Accordingly, there is a need for spring pack that requires less space within the transmission.

SUMMARY

A spring pack for a transmission includes first rotatable piston and a second rotatable piston. The first rotatable piston includes a first retainer plate, and the second rotatable piston includes a second retainer plate. The spring pack further includes a tabbed retainer plate that is stationary with respect to the first piston and the second piston and also includes a set of biasing members with a first subset of biasing members and a second subset of biasing members. The first subset of biasing members is disposed between the first retainer plate and the tabbed retainer plate, and the second subset of biasing members is disposed between the second retainer plate and the tabbed retainer plate. As the first and second pistons are activated, they stroke independently of each other as each retainer plate compresses its respective subset of biasing members against the tabbed retainer plate. When each piston is deactivated, the biasing force in the respective subset of biasing members urges each piston away from the tabbed retainer plate such that each piston can return to its off position which is typically different than the off position of the other piston.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
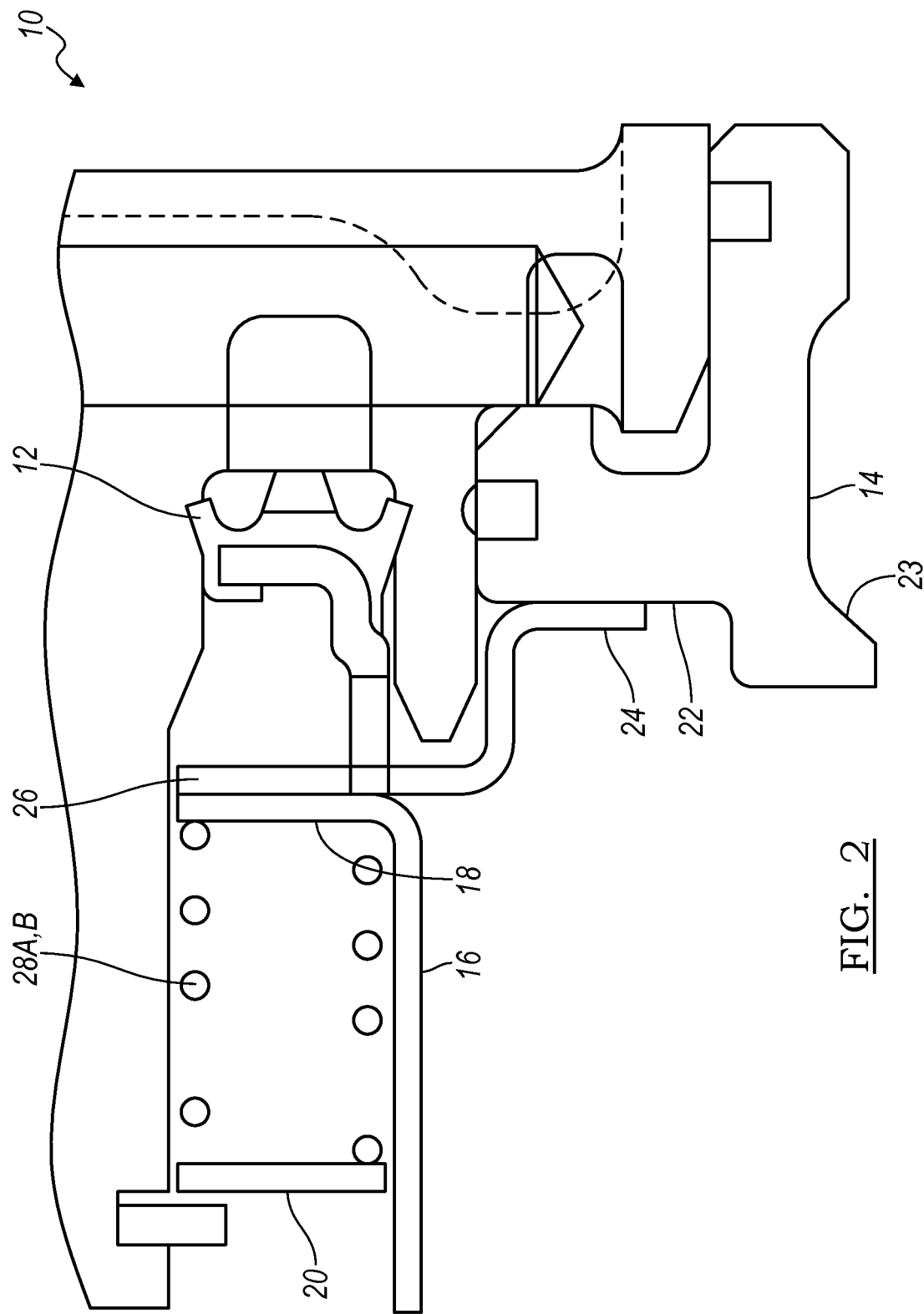

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 1 is perspective view of a spring pack for a motor vehicle transmission in accordance with the principles of the present invention; and FIG. 2 is a cross-sectional view of the spring pack shown in FIG. 1.

DETAILED DESCRIPTION

The following description is merely exemplary in nature and is not intended to limit the present disclosure, application, or uses.

Referring now to the drawings, a spring pack for a motor vehicle transmission embodying the principles of the present invention is illustrated in FIGS. 1 and 2 and designated at 10. The spring pack 10 includes a first rotatable annular piston 12 positioned about a shaft and a second rotatable annular piston 14 that is also positioned about the shaft.

A first retainer plate 16 is attached to the first piston 12 and includes extensions 18 that extend outwardly. A stationary tabbed retainer plate 20 with extensions 21 is disposed about the first retainer plate 16.

The second piston 14 includes a portion 22 that extends outwardly from a hub portion 23. A second retainer plate 24 is attached to the portion 22 of the second piston 14. The second retainer plate 24 includes extensions 26 that also extend outwardly through openings 27 in the first retainer plate 16.

A set of biasing members 28 are located between the retainer plate 20 and the extensions 18 and 26 of the first retainer plate 16 and the second retainer plate 24, respectively. Specifically, the set of biasing members 28 includes a first subset of biasing members 28a disposed between the retainer plate 20 and the extensions 18 of the first retainer plate 16 and further includes a second subset of biasing members 28b disposed between the tabbed retainer plate 20 and the extensions 26 of the second retainer plate 24. Accordingly, the first subset of biasing members 28a creates a biasing force that urges the extensions 18 away from the tabbed retainer plate 20, and the second subset of biasing members 28b creates a biasing force that urges the extensions 26 away from the tabbed retainer plate 20. The biasing members 28a and 28b can be coiled springs as shown in FIGS. 1 and 2, with each biasing member coiled about a respective extension 21, or the biasing members can be any other suitable components. The spring constants of the biasing members 28a and 28b can be the same or can be different.

The various components of the spring pack 10 can be made by any suitable process. For example, the pistons 12, 14 can be machined, die casted, or molded. The portion 22 of the second piston 14 can be integrally formed with the piston 14 or it can be formed separately and then attached to the inner hub portion 23 by any suitable process, such as, for example, welding. Similarly, the second retainer plate 24 and its extensions 26 can be formed separately and then attached to the portion 22 or they may be formed integrally with the portion 22 and the hub portion 23 of the second piston 14.

The first retainer plate 16 and its extensions 18 can be formed integrally with the first piston 12 or they may be formed separately and then attached to the first piston 12 by any suitable process, such as, for example, welding.

The tabbed retainer plate 20 as well as the other components associated with the first piston 12 and the second piston 14 can be formed by any suitable process, such as, for example, welding, machining, or die casting.

When the spring pack 10 is in use, each of the pistons 12 and 14 is selectively activated. When the first piston 12 is activated, the first piston 12 and consequently the extensions 18 of the first retainer plate 16 move towards the stationary tabbed retainer plate 20. As this occurs, the extensions 18 compress the first subset of biasing members 28a against the tabbed retainer plate 20. When the first piston 12 is deactivated, the biasing force of the compressed set of biasing members 28a urges the extensions 18 and hence the first piston 12 away from the retainer plate 20.

Similarly, when the second piston 14 is activated, the second piston 14 and hence the extensions 26 of the second retainer plate 24 move towards the stationary tabbed retainer plate 20. As this occurs, the extensions 26 compress the second subset of biasing members 28b against the tabbed retainer plate 20. When the second piston 14 is deactivated, the biasing force of the compressed set of biasing members 28b urges the extensions 26 and hence the second piston 14 away from the retainer plate 20.

The use of two retainer plates 16 and 24 with their respective set of biasing members 28a and 28b allow the retainer plates 16 and 24 to return to two different off positions. Further, the pistons 12 and 14 are able to stroke independently of each other, and the separate retainer plates 16 and 24 allow for different loads to be applied to the pistons 12 and 14.

Among other benefits, the use of a single set of springs 28 with two subsets of springs 28a and 28b in a single spring pack 10 occupies less space than the use of two difference spring packs, each with a different set of springs. Hence, the spring pack 10 is likely to be less costly to make and uses less material (and hence weighs less) than two separate spring packs while providing the same performance as two separate spring packs.

The description of the invention is merely exemplary in nature and variations that do not depart from the gist of the invention are intended to be within the scope of the invention. Such variations are not to be regarded as a departure from the spirit and scope of the invention.

What is claimed is:

1. A spring pack for a motor vehicle transmission comprising:
    a first rotatable annular piston with a first retainer plate, the first rotatable annular piston configured to be positioned about a shaft;
    a second rotatable annular piston with a second retainer plate, the second rotatable annular piston configured to be positioned about the shaft;
    a tabbed retainer plate that is stationary with respect to the first rotatable annular piston and the second rotatable annular piston; and
    a plurality of biasing members with a first subset of biasing members positioned between the first retainer plate and the tabbed retainer plate and a second subset of biasing members positioned between the second retainer plate and the tabbed retainer plate, the second retainer plate including a set of extensions that extend outwardly, the second subset of biasing members being positioned between the tabbed retainer plate and the set of extensions of the second retainer plate, the first retainer plate including openings and the extensions of the second retainer plate extending through the openings in the first retainer plate,
    wherein as each of the first piston and the second piston is activated, the first and second pistons stroke independently of each other as each of the first and second retainer plates compresses the first subset of biasing members and the second subset of biasing members, respectively, against the tabbed retainer plate.

2. The spring pack of claim 1 wherein the tabbed retainer plate is disposed about the first retainer plate.

3. The spring pack of claim 1 wherein the first retainer plate includes a set of extensions that extend outwardly, the first subset of biasing members being positioned between the tabbed retainer plate and the set of extensions of the first retainer plate.

4. The spring pack of claim 1 wherein the first subset of biasing members and the second subset of biasing members are coiled springs.

5. The spring pack of claim 1 wherein the first subset of biasing members has a first spring constant and the second subset of biasing members has a second spring constant that is the same as the first spring constant.

6. The spring pack of claim 1 wherein the first subset of biasing members has a first spring constant and the second subset of biasing members has a second spring constant that is different than the first spring constant.

7. The spring pack of claim 1 wherein the first piston and the second piston are machined, die casted, or molded.

8. The spring pack of claim 1 wherein the first retainer plate is formed integrally with the first piston.

9. The spring pack of claim 1 wherein the first retainer plate is a separate component that is attached to the first piston.

10. The spring pack of claim 1 wherein the second retainer plate is formed integrally with a portion of a hub portion of the second piston.

11. The spring pack of claim 1 wherein the second retainer plate is a separate component that is attached to a portion of a hub portion of the second piston.

12. The spring pack of claim 1 wherein the tabbed retainer plate is machined, molded, or die casted.

13. The spring pack of claim 1 wherein when each of the first and second pistons is deactivated, a biasing force in the first subset of biasing members and a biasing force in the second subset of biasing members urges the first piston and the second piston, respectively, away from the tabbed retainer plate such that each piston returns to a respective off position.

14. The spring pack of claim 13 wherein the off position of the first piston is different than the off position of the second piston.

* * * * *